(12) United States Patent
Yeh et al.

(10) Patent No.: US 11,054,659 B2
(45) Date of Patent: Jul. 6, 2021

(54) HEAD MOUNTED DISPLAY APPARATUS AND DISTANCE MEASUREMENT DEVICE THEREOF

(71) Applicant: HTC Corporation, Taoyuan (TW)

(72) Inventors: Chia-Hua Yeh, Taoyuan (TW); Chun-Ta Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/004,006

(22) Filed: Aug. 27, 2020

(65) Prior Publication Data

US 2021/0141231 A1 May 13, 2021

Related U.S. Application Data

(60) Provisional application No. 62/932,480, filed on Nov. 7, 2019.

(51) Int. Cl.
*G02B 27/01* (2006.01)

(52) U.S. Cl.
CPC ....... *G02B 27/0179* (2013.01); *G02B 27/017* (2013.01); *G02B 2027/0138* (2013.01); *G02B 2027/0178* (2013.01); *G02B 2027/0187* (2013.01)

(58) Field of Classification Search
CPC .............. G02B 27/0179; G02B 27/017; G02B 2027/0138; G02B 2027/0178; G02B 2027/0187

See application file for complete search history.

(56) References Cited

U.S. PATENT DOCUMENTS

| | | | | | |
|---|---|---|---|---|---|
| 5,606,458 | A | * | 2/1997 | Fergason | G02B 27/0172 359/630 |
| 6,008,945 | A | * | 12/1999 | Fergason | G02B 27/0172 359/630 |
| 10,247,813 | B2 | * | 4/2019 | Huang | G02B 7/287 |
| 10,852,619 | B1 | * | 12/2020 | Yaroshchuk | G02B 7/04 |
| 10,901,225 | B1 | * | 1/2021 | De Nardi | G02B 27/0093 |
| 2002/0171939 | A1 | * | 11/2002 | Song | G02B 27/0172 359/630 |
| 2002/0181115 | A1 | * | 12/2002 | Massof | G02B 27/0172 359/630 |
| 2014/0184724 | A1 | * | 7/2014 | Cho | H04N 7/144 348/14.07 |
| 2014/0333665 | A1 | * | 11/2014 | Sylvan | G06F 3/013 345/633 |
| 2016/0070345 | A1 | * | 3/2016 | Huang | A61B 3/12 351/206 |

(Continued)

*Primary Examiner* — Dmitriy Bolotin
(74) *Attorney, Agent, or Firm* — JCIPRNET

(57) ABSTRACT

A head mounted display apparatus and a distance measurement device are provided. The distance measurement device includes an image capturing device, a lens set, a position adjuster, and a controller. The position adjuster is configured to adjust positions of the image capturing device and the lens set. The position adjuster respectively adjusts the positions of the image capturing device and the lens set at a plurality of time points. The image capturing device respectively obtains a plurality of images of a target area at the plurality of time points. The controller accordingly obtains a separation distance between the lens set and the target area according to the plurality of images.

12 Claims, 8 Drawing Sheets

(56) References Cited

U.S. PATENT DOCUMENTS

| | | | |
|---|---|---|---|
| 2016/0084949 A1* | 3/2016 | Huang | G02B 7/287 |
| | | | 348/78 |
| 2016/0109724 A1* | 4/2016 | Anderson | G02B 25/004 |
| | | | 351/118 |
| 2016/0110600 A1* | 4/2016 | Huang | G01C 3/32 |
| | | | 348/78 |
| 2016/0139412 A1* | 5/2016 | Sawada | G02B 17/002 |
| | | | 359/630 |
| 2016/0150951 A1* | 6/2016 | Du | A61B 3/113 |
| | | | 351/206 |
| 2017/0184847 A1* | 6/2017 | Petrov | H04N 5/2256 |
| 2020/0322518 A1* | 10/2020 | Nagata | H04N 5/23216 |
| 2021/0132397 A1* | 5/2021 | Stellman | G02B 27/0172 |

\* cited by examiner

HEAD MOUNTED DISPLAY APPARATUS AND DISTANCE MEASUREMENT DEVICE THEREOF

CROSS-REFERENCE TO RELATED APPLICATION

This application claims the priority benefit of U.S. Provisional Application No. 62/932,480, filed on Nov. 7, 2019. The entirety of the above-mentioned patent application is hereby incorporated by reference herein and made a part of this specification.

BACKGROUND OF THE INVENTION

Field of the Invention

The invention relates to a head mounted display apparatus and a distance measurement device thereof, and more particularly to a head mounted display apparatus capable of detecting eye distance and a distance measurement device thereof.

Description of Related Art

In today's industrial era focusing on big data analysis, position information of the human eyeball is dynamically recorded via eye tracking techniques to be used as research and data for analysis of various behavior patterns, and to be further applied in fields such as medicine, business, and entertainment. In virtual reality and augmented reality display apparatuses, the eyeball is often irradiated in general eye tracking techniques via a single camera and a near-infrared light source to obtain a pupil image. Based on the pupil images of both eyes and by calculating via an algorithm, the direction of the attention of the user may be known. However, in the prior art, the obtained pupil images are all flat (2D) images, and there is no eye relief (ER) information. In a situation where the user is looking at a distant object, the measurement accuracy of the ER affects the accuracy of eye tracking and positioning. In the prior art, more cameras are often added to the hardware to capture ER information, but this method greatly increases the cost of the product.

SUMMARY OF THE INVENTION

The invention provides a plurality of head mounted display apparatuses and a distance measurement device thereof that may effectively detect the eye distance between a user and the head mounted display apparatuses.

A distance measurement device of the invention includes an image capturing device, a lens set, a position adjuster, and a controller. The lens set has a first side facing the image capturing device and a second side facing a target area. The first side is opposite to the second side. The position adjuster is coupled to the image capturing device and the lens set and configured to adjust positions of the image capturing device and the lens set. The controller is coupled to the image capturing device. In particular, the position adjuster respectively adjusts the positions of the image capturing device and the lens set at a plurality of time points, and the image capturing device obtains a plurality of images of the target area at the plurality of time points. The controller accordingly obtains a separation distance between the lens set and the target area according to the plurality of images.

Another distance measurement device of the invention includes an image capturing device, a lens set, and a controller. The lens set has a first side facing the image capturing device and a second side facing a target area. The first side is opposite to the second side. The lens set is a lens set with a variable focal length. The controller is coupled to the image capturing device. In particular, the controller respectively adjusts a focal length of the lens set at a plurality of time points, and the image capturing device respectively obtains a plurality of images of the target area at the plurality of time points. The controller obtains a separation distance between the lens set and the target area according to the plurality of images.

A head mounted display apparatus of the invention includes a distance measurement device. The distance measurement device includes an image capturing device, a lens set, a position adjuster, and a controller. The lens set has a first side facing the image capturing device and a second side facing a target area. The first side is opposite to the second side. The position adjuster is coupled to the image capturing device and the lens set and configured to adjust positions of the image capturing device and the lens set. The controller is coupled to the image capturing device. In particular, the position adjuster respectively adjusts the positions of the image capturing device and the lens set at a plurality of time points, and the image capturing device obtains a plurality of images of the target area at the plurality of time points. The controller accordingly obtains a separation distance between the lens set and the target area according to the plurality of images.

Another head mounted display apparatus of the invention includes a distance measurement device. The distance measurement device includes an image capturing device, a lens set, and a controller. The lens set has a first side facing the image capturing device and a second side facing a target area. The first side is opposite to the second side. The lens set is a lens set with a variable focal length. The controller is coupled to the image capturing device. In particular, the controller respectively adjusts a focal length of the lens set at a plurality of time points, and the image capturing device respectively obtains a plurality of images of the target area at the plurality of time points. The controller obtains a separation distance between the lens set and the target area according to the plurality of images.

Based on the above, the distance measurement device of the invention adjusts the focal length of the lens set or adjusts the positions of the lens set and the image capturing device at different time points to perform an image capture operation for the target area. Then, analysis is performed according to the obtained image of the target area to obtain the separation distance between the target area and the lens set. In the head mounted display apparatus, the distance measurement device may be configured to measure the separation distance between the eyeball of the user and the lens set to complete the detection operation of eye distance and to accordingly improve the accuracy of eye tracking movements.

DESCRIPTION OF THE EMBODIMENTS

Figure 1:
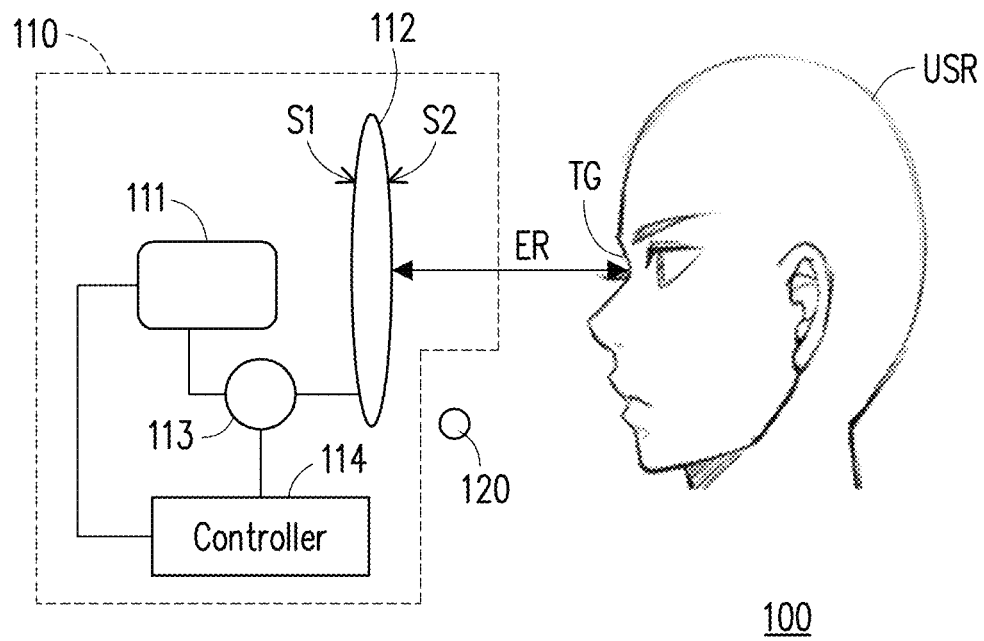
FIG. 1 shows a diagram of a head mounted display apparatus of an embodiment of the invention.

Referring to FIG. 1, FIG. 1 shows a diagram of a head mounted display apparatus of an embodiment of the invention. A head mounted display apparatus 100 includes a distance measurement device 110 and an infrared transmitter 120. The distance measurement device 110 includes an image capturing device 111, a lens set 112, a position adjuster 113, and a controller 114. The lens set 112 has a first side S1 and a second side S2 opposite to each other. In particular, the first side S1 of the lens set 112 faces the image capturing device 111, and the second side S2 of the lens set 112 faces a target area TG. In the present embodiment, the target area TG corresponds to an area of an eyeball of a user USR.

Figure 2:
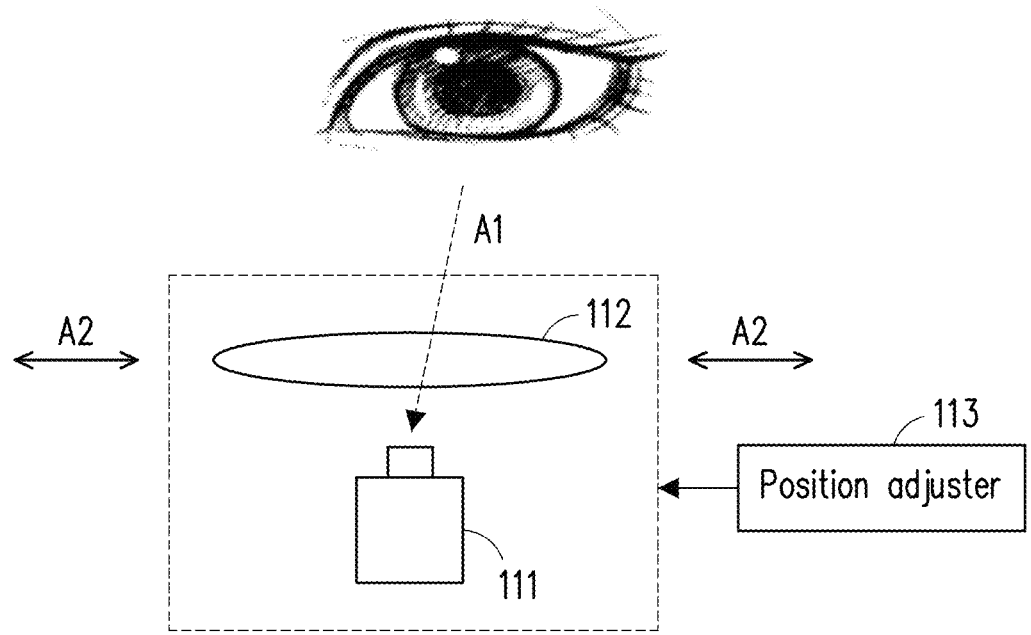
FIG. 2 shows a diagram of the operation mode of a position adjuster of an embodiment of the invention.

In addition, the position adjuster 113 is coupled to the image capturing device 111 and the lens set 112. The position adjuster 113 is configured to adjust positions of the image capturing device 111 and the lens set 112. Regarding the operation mode of the position adjuster 113, refer to the diagram of the operation mode of the position adjuster of the embodiment of the invention shown in FIG. 2. In FIG. 2, the image capturing device 111 may capture an image of the target area TG (an image of the eyeball of the user) via the lens set 112 according to an image capturing direction A1. The position adjuster 113 is configured to perform an adjustment operation on the positions of the image capturing device 111 and the lens set 112 according to an adjustment direction A2. In the present embodiment, the direction A1 and the adjustment direction A2 are not parallel to each other.

Please refer to FIG. 1 again. In the present embodiment, when performing the detection operation of a separation distance ER between the target area TG and the lens set 112, the position adjuster 113 may adjust the positions of the image capturing device 111 and the lens set 112 at a plurality of time points, respectively. The image capturing device 111 respectively obtains a plurality of images of the target area TG at the plurality of time points. In addition, the image capturing device 111 is coupled to the controller 114 and transmits the plurality of captured images to the controller 114. The controller 114 performs a calculation according to the plurality of received images and accordingly obtains the separation distance ER between the lens set 112 and the target area TG. In the present embodiment, the separation distance ER is the distance from an eye of the user USR to the lens set.

Figure 3:
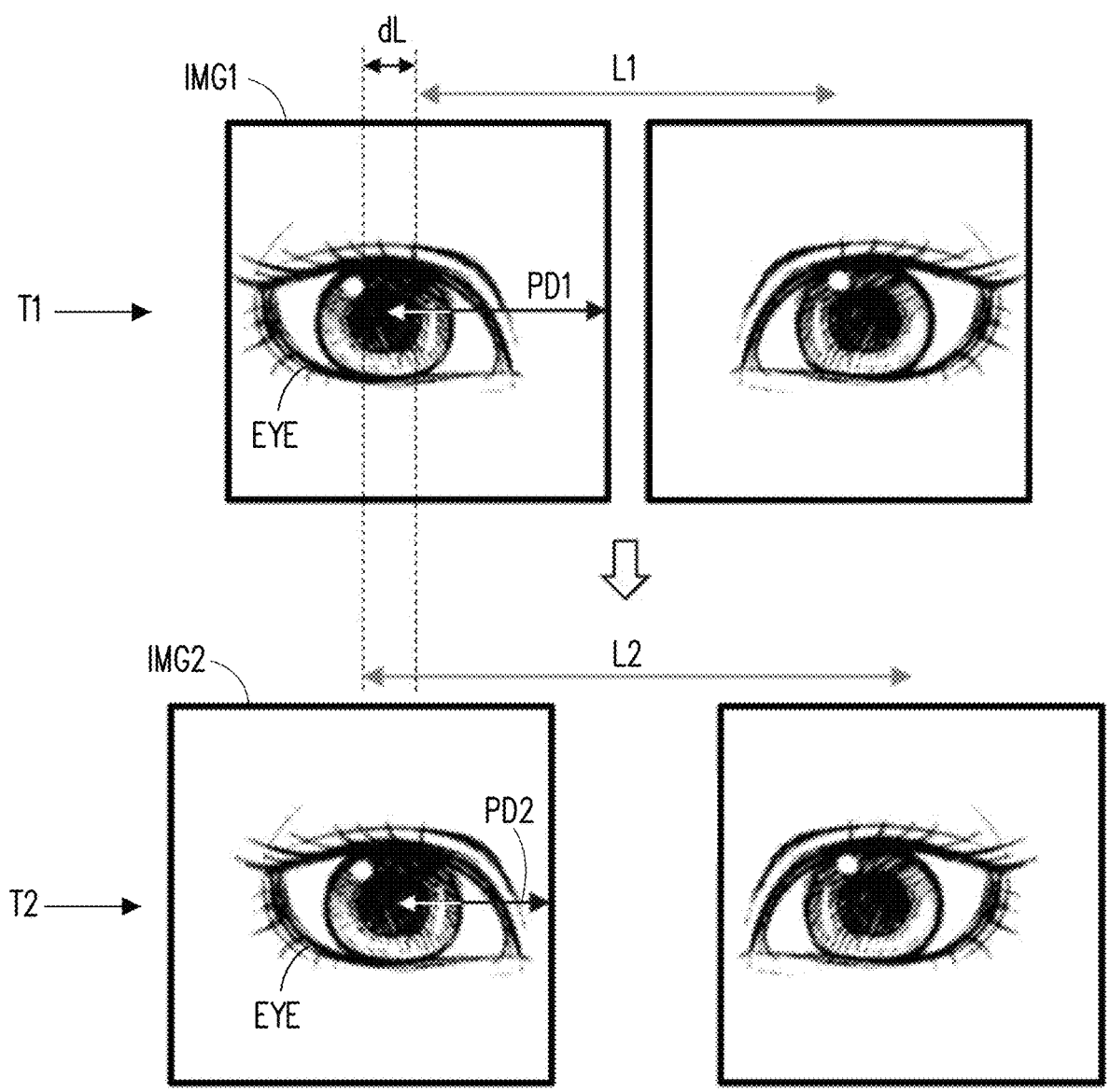
FIG. 3 and FIG. 4 show diagrams of the head mounted display apparatus of the embodiment of FIG. 1 of the invention performing a separation distance detection operation.
Figure 4:
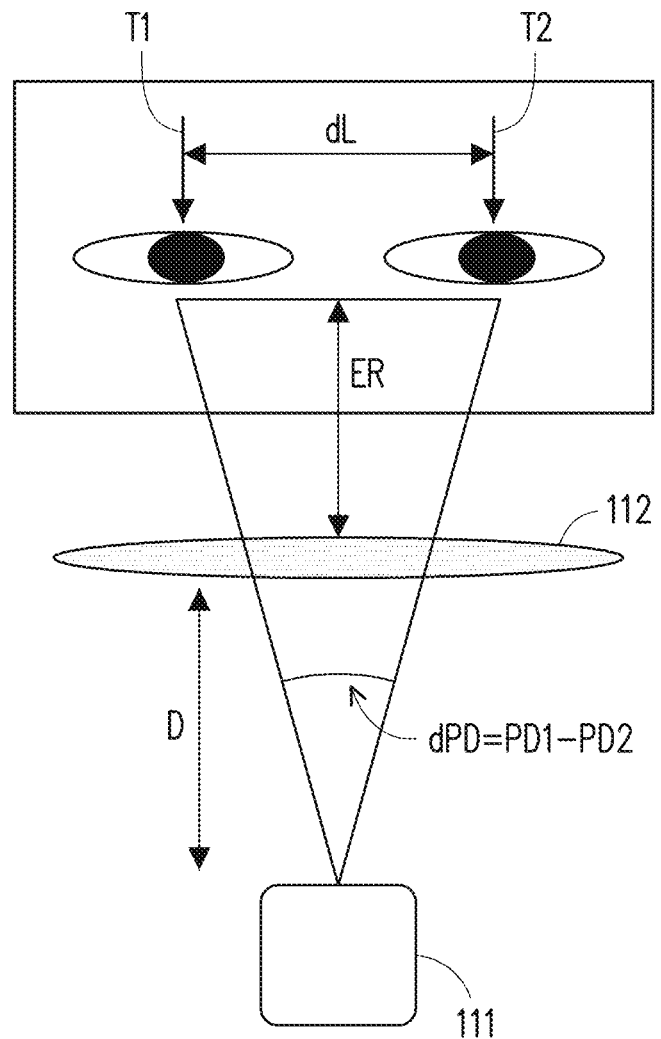

For details, please refer to FIG. 1, FIG. 3, and FIG. 4. FIG. 3 and FIG. 4 show diagrams of the head mounted display apparatus of the embodiment of FIG. 1 performing a detection operation of separation distance. In FIG. 3, at a first time point T1, the position adjuster 113 sets a first position of the image capturing device 111 and the lens set 112, and provides the head mounted display apparatus 100 with a first inter-pupillary distance L1. In addition, at a second time point T2, the position adjuster 113 adjusts the image capturing device 111 and the lens set 112 to a second position, and provides the head mounted display apparatus 100 with a second inter-pupillary distance L2. In the present embodiment, the second inter-pupillary distance L2 is greater than the first inter-pupillary distance L1.

In addition, at the first time point T1, the image capturing device 111 performs an image capture operation for the target area TG via the lens set 112, and obtains an image IMG1. At the second time point T2, the image capturing device 111 performs another image capture operation for the target area TG via the lens set 112, and obtains an image IMG2. The controller 114 may calculate a distance PD1 of the center of a target EYE (eyeball of the user USR) in the image IMG1 and the edge of the image IMG1; the controller 114 may calculate a distance PD2 of the center of the target EYE in the image IMG2 and the edge of the image IMG2. The controller 114 also calculates the difference between the distances PD1 and PD2 to obtain an offset value. In this way, the controller 114 may obtain the separation distance ER between the lens set 112 and the target area TG according to an offset value dL, a distance difference dPD, and the distance between the lens set 112 and the image capturing device 111.

Please also refer to FIG. 4 below. Between the time points T1 and T2, the lens set 112 and the image capturing device 111 and the eyeball of the user produce a relative movement equal to the offset value dL. According to the description of the embodiment in FIG. 3, it may be known that the offset angle generated between the image capturing device 111 and the eyeball of the user at the time points T1 and T2 is equal to the distance difference dPD (=the distance PD1 minus the distance PD2). On the premise that a distance D between the lens set 112 and the image capturing device 111 is known, (D+ER)×dPD=dL may be calculated, and the separation distance $$ER = \frac{dL}{dPD} - D$$

may be calculated.

It should be mentioned that, in the present embodiment, the lens set 112 may be composed of one or a plurality of lenses. The image capturing device 111 may be a camera. The controller 114 may be a processor with computing power. Or, the controller 114 may be designed by a hardware description language (HDL) or any other design methods of a digital circuit known to those having ordinary skill in the art, and is a hardware circuit implemented by a field-programmable gate array (FPGA), complex programmable logic device (CPLD), or application-specific integrated circuit (ASIC). The image capturing device 111, the lens set 112, and the controller 114 may be disposed in a tube of the head mounted display apparatus 100 together.

In addition, the infrared emitter 120 may have one or a plurality of infrared light-emitting diodes. When performing the eye tracking operation of the user USR, the infrared emitter 120 may send a plurality of infrared light beams to the eyeball of the user USR and form a plurality of light spots on the eyeball. The infrared emitter 120 and the distance measurement device 110 may be disposed in the tube of the head mounted display apparatus 100 together.

Figure 5:
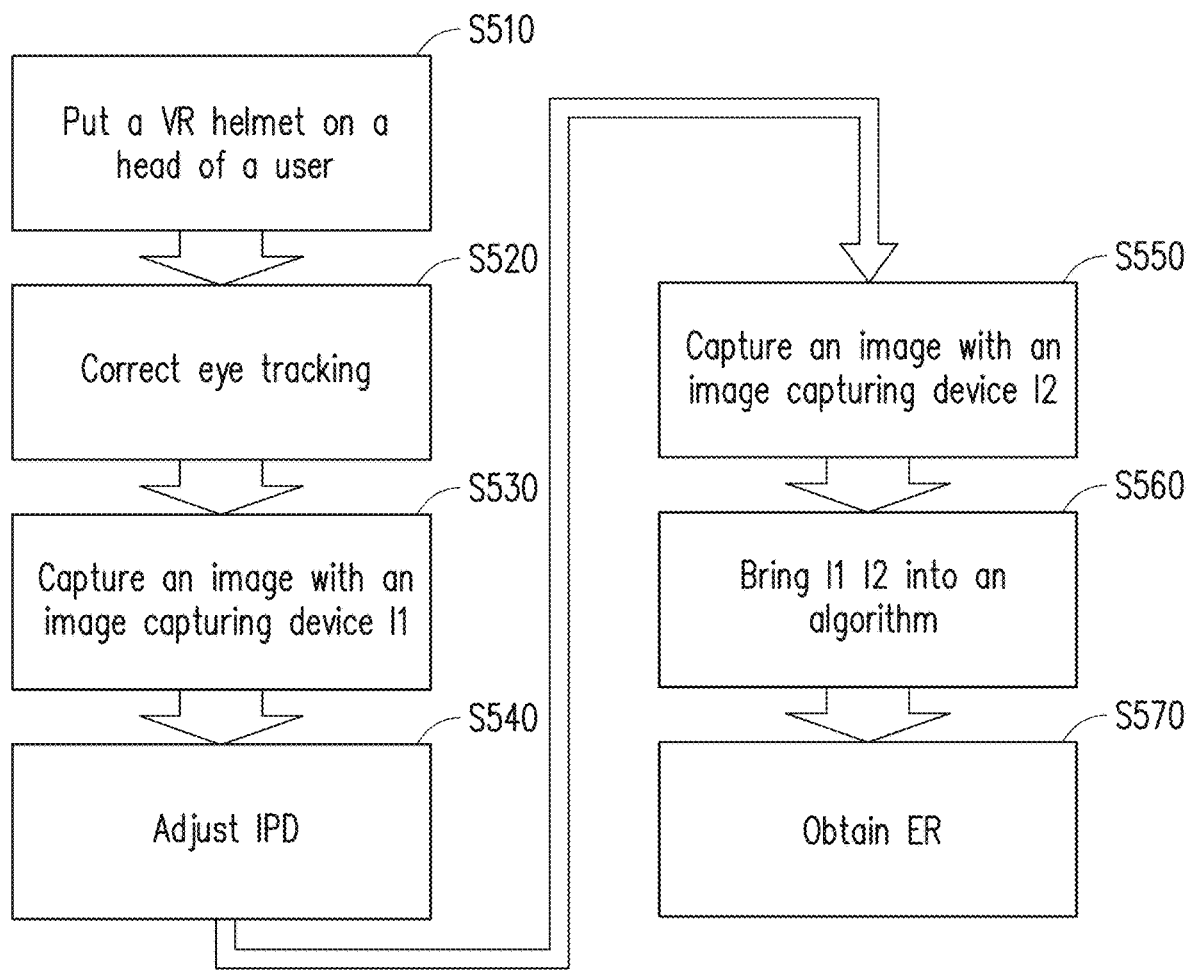
FIG. 5 shows a flowchart of the separation distance detection operation of the embodiment of FIG. 1 of the invention.

Next, referring to FIG. 5, FIG. 5 shows a flowchart of the separation distance detection operation of the embodiment of FIG. 1 of the invention. In step S510, a user puts on a virtual reality (VR) helmet (head mounted display apparatus). In step S520, an eye tracking correction operation is performed. In the eye tracking correction operation in step S530, the image capturing device may capture an image I1 for an eyeball of the user. Furthermore, in step S540, the inter-pupillary distance (IPD) of the head mounted display apparatus may be adjusted via a position adjuster. After the adjustment operation of the inter-pupillary distance is completed, in step S550, the image capturing device may capture an image I2 for the eyeball of the user. In step S560, the obtained images I1 and I2 may be brought into the algorithm described in the embodiment of FIG. 4, and the separation distance ER is obtained in step S570.

Figure 6:
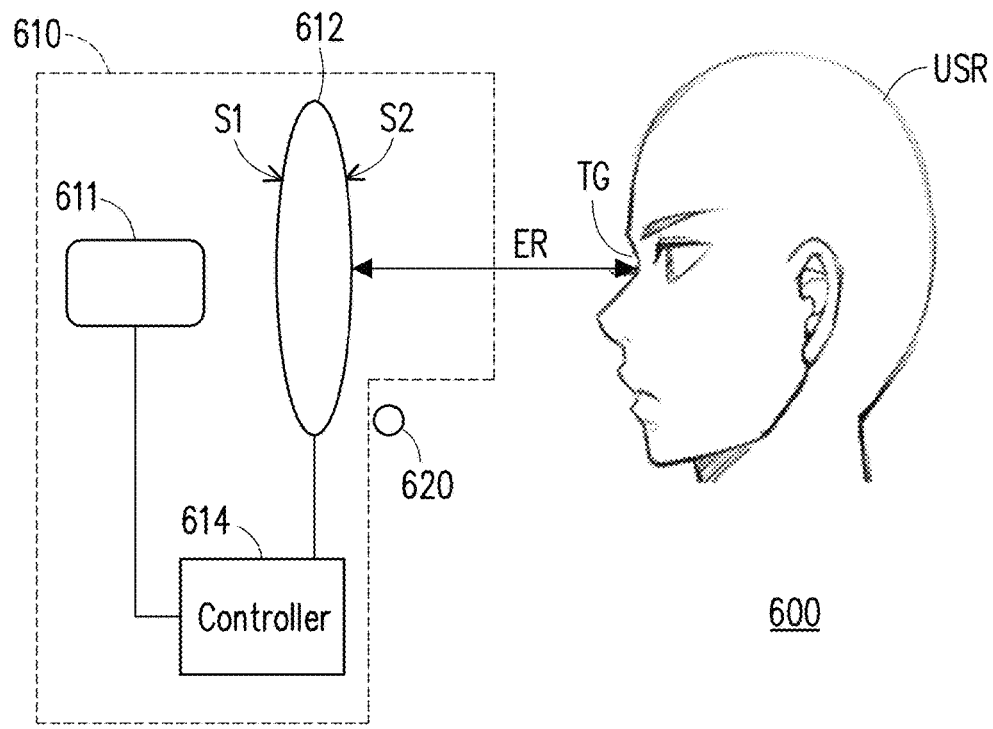
FIG. 6 shows a diagram of a head mounted display apparatus of another embodiment of the invention.

Referring to FIG. 6, FIG. 6 shows a diagram of a head mounted display apparatus of another embodiment of the invention. A head mounted display apparatus 600 includes a distance measurement device 610 and an infrared transmitter 620. The distance measurement device 610 includes an image capturing device 611, a lens set 612, and a controller 614. The lens set 612 has a first side S1 facing the image capturing device 611. The lens set 612 also has a second side S2 facing the target area TG, wherein the first side S1 is opposite to the second side S2. The target area TG corresponds to the eyeball position of the user USR of the head mounted display apparatus 600. The lens set 612 may be composed of one or a plurality of lenses. In the present embodiment, the lens set 612 is a lens set with a variable focal length.

The controller 614 is coupled to the image capturing device 611 and the lens set 612. When a distance detection operation is performed, the controller 614 may respectively adjust the focal length of the lens set at a plurality of time points. The image capturing device 611 respectively obtains a plurality of images of the target area TG at the plurality of time points. The image capturing device 611 transmits the obtained images to the controller 614. The controller 614 may obtain the separation distance ER between the lens set 612 and the target area TG according to the plurality of images.

Figure 7:
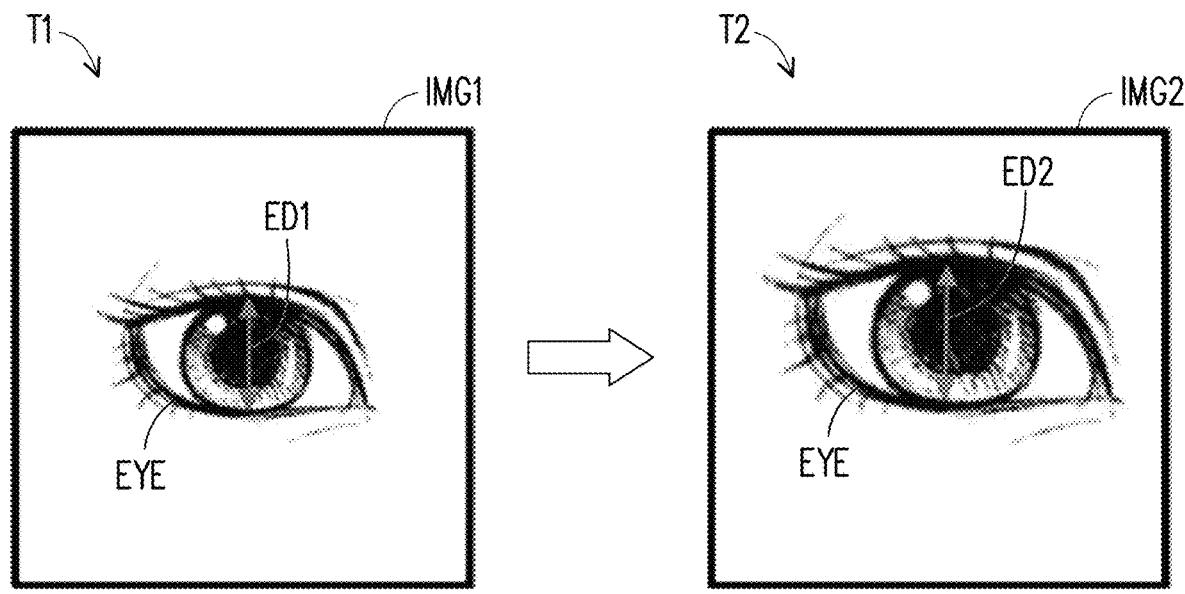
FIG. 7 and FIG. 8 show diagrams of the head mounted display apparatus of the embodiment of FIG. 6 of the invention performing a separation distance detection operation.
Figure 8:
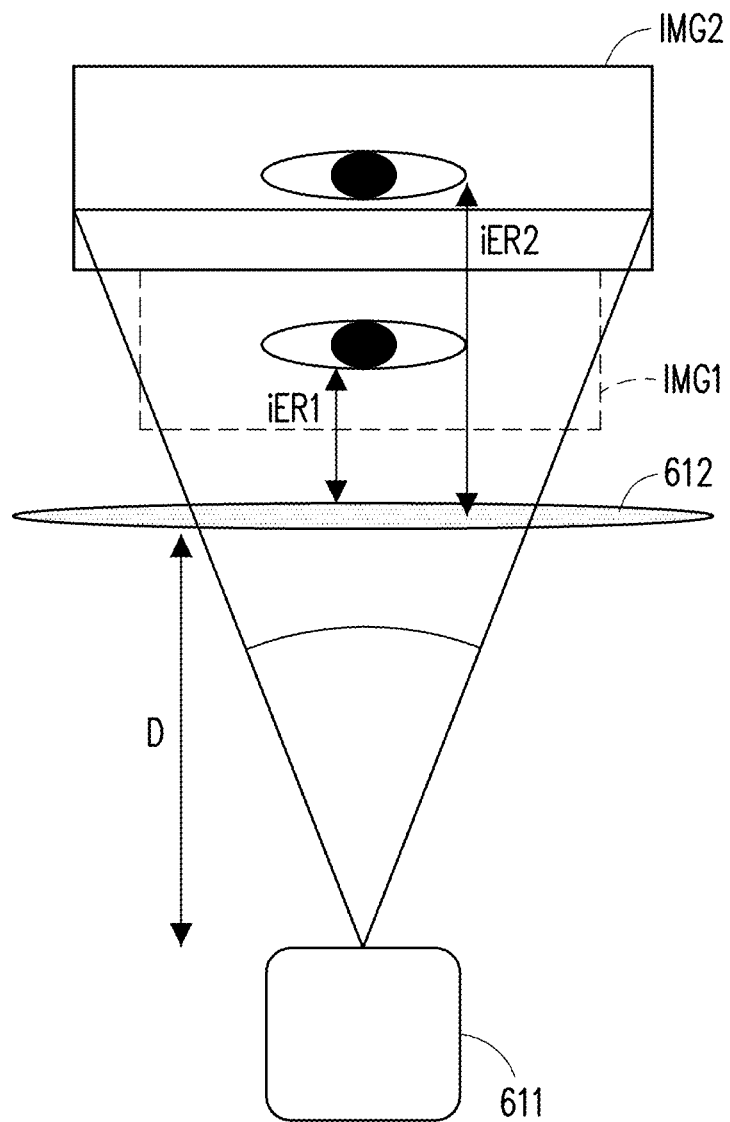

For details, refer to FIG. 6, FIG. 7, and FIG. 8 simultaneously. In particular, FIG. 7 and FIG. 8 show diagrams of the head mounted display apparatus of the embodiment of FIG. 6 of the invention performing a separation distance detection operation. In particular, in FIG. 7, at the time point T1, the lens set 612 may be set to have a first focal length according to a command of the controller 614. At the same time, the image capturing device 611 may obtain the image IMG1 of the target area TG. Then, at the time point T2, the lens set 612 may be set to have a second focal length according to another command of the controller 614. At the same time, the image capturing device 611 may obtain the other image IMG2 of the target area TG.

The controller 614 may analyze the images IMG1 and IMG2, calculate a first size ED1 of the target EYE (the eyeball of the user USR) in the image IMG1, and calculate a second size ED2 of the target EYE in the IMG2. In the present embodiment, the controller 614 respectively obtains the first size ED1 and the second size ED2 by calculating the eye height of the target EYE in the images IMG1 and IMG2.

Further, the controller 614 may calculate the separation distance ER according to the first focal length, the second focal length, the first size ED1, the second size ED2, and the distance between the lens set 612 and the image capturing device 611.

In FIG. 8, the images IMG1 and IMG2 are virtual images formed when the lens set 612 has a first focal length f1 and a second focal length f2, respectively. At the time point T1, the size of the virtual image IMG1 and the eye distance are in a trigonometric function relationship, and the mathematical formula (1):

$$\frac{SA1}{ED1} = iER1 + D$$

may be obtained. In particular, SA1 represents the size of the target EYE (eyeball) in the image IMG1, the first size ED1 may represent the number of pixels the eyeball occupies in the first image IMG1=a first angle, the distance D is the distance between the lens set 612 and the image capturing device 611, and a distance iER1 is the eye distance of the image (virtual image) IMG1. At the time point T2, the size of the virtual image IMG2 and the eye distance are also in a trigonometric function relationship, and the mathematical formula (2):

$$\frac{SA2}{ED2} = iER2 + D$$

may be obtained. In particular, SA2 represents the size of the target EYE (eyeball) in the image IMG2, and the second size ED2 may represent the number of pixels the eyeball occupies in the second image IMG2=a second angle, and a distance iER2 is the eye distance of the image (virtual image) IMG2.

In addition, at the time point T1, according to the first focal length f1 of the lens set 612, the mathematical formula (3):

$$\frac{1}{iER1} + \frac{1}{ER} = \frac{1}{f1}$$

may be obtained based on the lens maker formula. Similarly, at the time point T2, according to the second focal length f2 of the lens set 612, the mathematical formula (4):

$$\frac{1}{iER2} + \frac{1}{ER} = \frac{1}{f2}$$

may be obtained based on the lens maker formula. By calculating the virtual image and SA1 and SA2 in the images IMG1 and IMG2, the mathematical formula (5):

$$SA1 = \frac{iER1}{ER} \times S$$

and the mathematical formula (6):

$$SA2 = \frac{iER2}{ER} \times S$$

may be obtained respectively. In particular, S is the actual size of the eye.

According to the six mathematical formula (1) to mathematical formula (6), the six unknowns (SA1, SA2, iER1, iER2, ER, and S) may be solved. Accordingly, the controller 614 may calculate the separation distance ER between the target area TG and the lens set 612.

In the present embodiment, the lens set 612 may be composed of one or a plurality of lenses. The image capturing device 611 may be a camera. The controller 614 may be a processor with computing power. Or, the controller 614 may be designed by a hardware description language (HDL) or any other design methods of a digital circuit known to those having ordinary skill in the art, and is a hardware circuit implemented by a field-programmable gate array (FPGA), complex programmable logic device (CPLD), or application-specific integrated circuit (ASIC). The image capturing device 611, the lens set 612, and the controller 614 may be disposed in a tube of the head mounted display apparatus 600 together.

Figure 9:
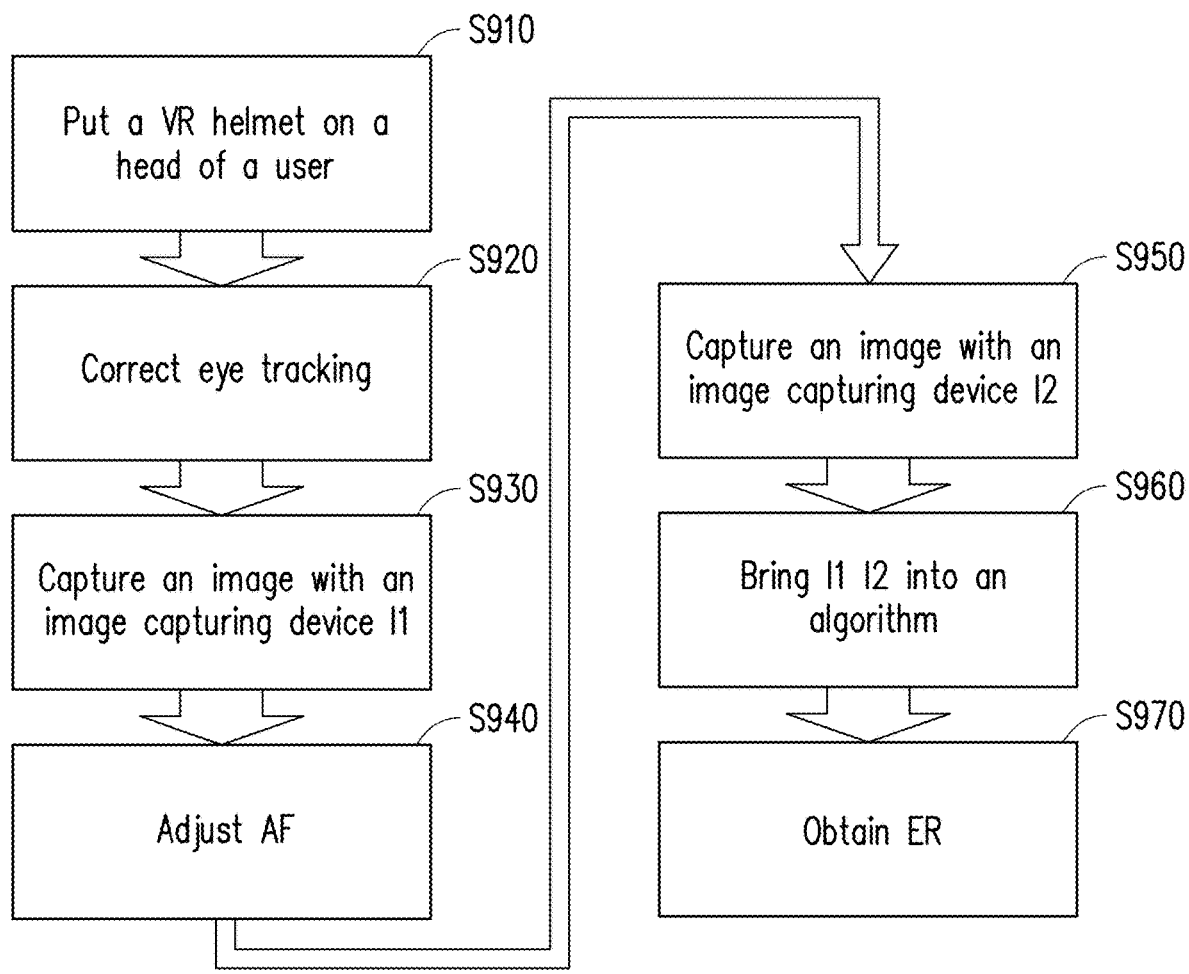
FIG. 9 shows a flowchart of the separation distance detection operation of the embodiment of FIG. 6 of the invention.

Referring to FIG. 9 below, FIG. 9 shows a flowchart of the separation distance detection operation of the embodiment of FIG. 6 of the invention. In step S910, a user puts on a virtual reality (VR) helmet (head mounted display apparatus). In step S920, an eye tracking correction operation is performed. In the eye tracking correction operation, in step S930, the image capturing device may capture the image I1 for an eyeball of the user. At this time, the focal length (AF) of the lens set is a first focal length. Moreover, in step S940, the focal length (AF) of the lens set is adjusted to a second focal length, and in step S950, the image capturing device may capture the image I2 for an eyeball of the user. In step S960, the obtained images I1 and I2 may be brought into the algorithm described in the embodiment of FIG. 8, and the separation distance ER is obtained in step S970.

Figure 10:
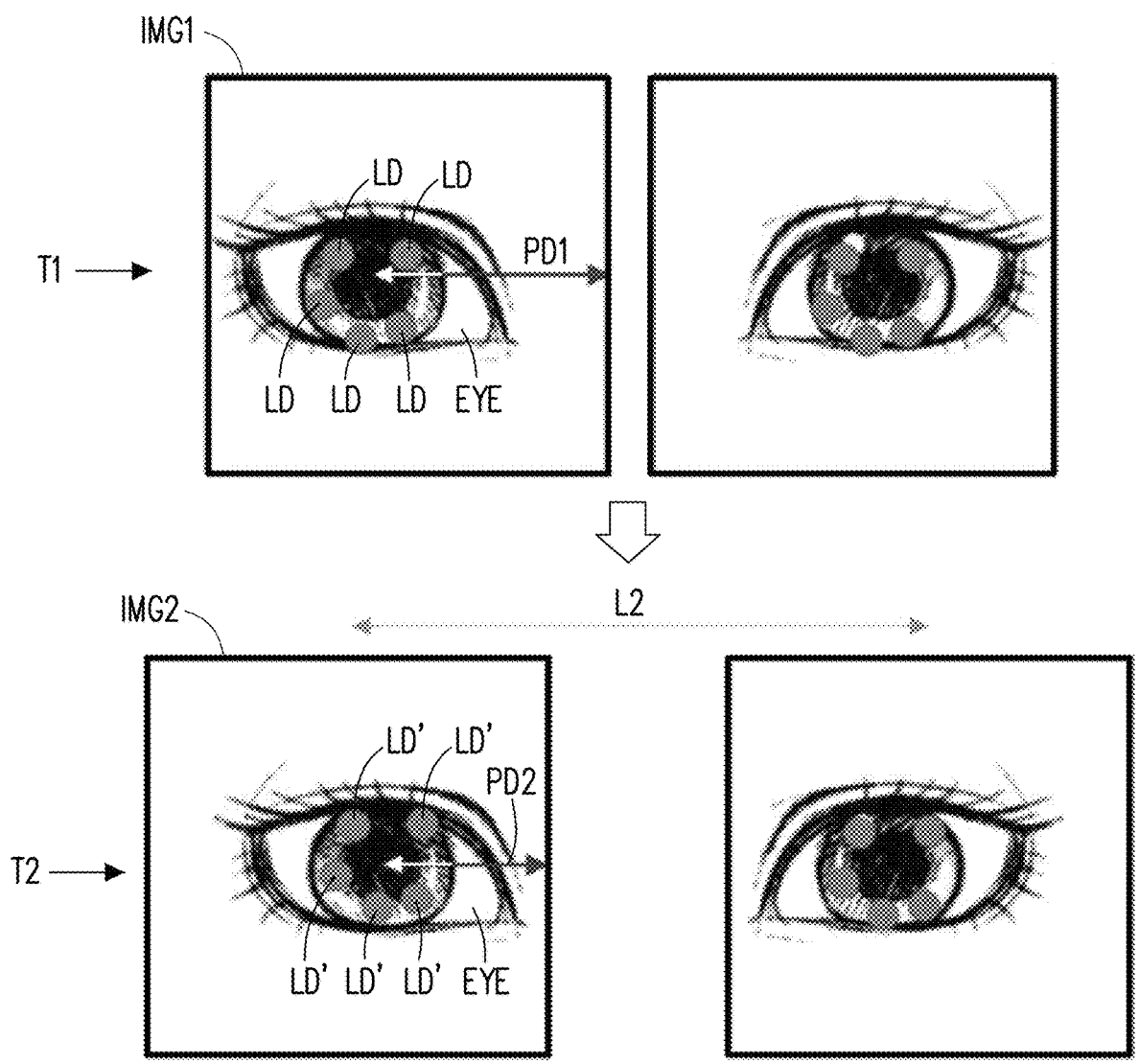
FIG. 10 shows a diagram of an eyeball curvature detection method of an embodiment of the invention.

Please refer to FIG. 10 below. FIG. 10 shows a diagram of an eyeball curvature detection method of an embodiment of the invention. By incorporating the hardware architecture and operation method of the head mounted display apparatus 100 shown in FIG. 1, the infrared emitter 120 may generate a plurality of light spots on the eyeball. At the time point T1, the image capturing device 111 may obtain the image IMG1. In particular, the target (eyeball) EYE in the image IMG1 has a plurality of light spot images LD. Then, at the time point T2, via the position adjustment operation of the position adjuster 113, the image capturing device 111 may obtain the image IMG2. In particular, the target (eyeball) EYE in the image IMG2 has a plurality of light spot images LD'.

According to the implementation details of the embodiment in FIG. 1, the separation distance ER between the center of the eyeball and the lens set 112 may be calculated according to the distances PD1 and PD2. Then, using the eye distance of the center of the eye (separation distance ER) as a reference, a 3D algorithm is introduced, such as structured illumination microscopy (SIM), to reconstruct a 3D model of the eyeball. Accordingly, the degree of myopia (or hyperopia) of the eyeball of the user USR may be known.

After knowing the degree of myopia (or hyperopia) of the eyeball of the user USR, the head mounted display apparatus 100 of an embodiment of the invention may adjust the focal length of the lens set 112 accordingly. In this way, the user USR does not need to wear myopia glasses and may still see a clear display image.

Here, the calculation operation of the eyeball curvature of FIG. 10 may also be implemented via the head mounted display apparatus 600 of FIG. 6 of the invention. The implementation details are similar to those described above and are not repeated herein.

Based on the above, in the head mounted display apparatus of the invention, via a distance detecting apparatus, the eye distance of the user is automatically detected. Without excessive hardware components, the display performance of the head mounted display apparatus is effectively improved.

What is claimed is:

1. A distance measurement device, comprising:
   an image capturing device;
   a lens set having a first side facing the image capturing device and a second side facing a target area, wherein the first side is opposite to the second side;
   a position adjuster coupled to the image capturing device and the lens set, and is configured to adjust positions of the image capturing device and the lens set; and
   a controller coupled to the image capturing device,
   wherein the position adjuster respectively adjusts the positions of the image capturing device and the lens set at a plurality of time points, the image capturing device respectively obtains a plurality of images of the target area at the time points, and the controller obtains a separation distance between the lens set and the target area according to the images.

2. The distance measurement device of claim 1, wherein the position adjuster adjusts the positions of the image capturing device and the lens set along an adjustment direction, and the adjustment direction and an image capturing direction of the image capturing device are not parallel to each other.

3. The distance measurement device of claim 1, wherein the position adjuster puts the image capturing device and the lens set at a first position at a first time point, the position adjuster puts the image capturing device and the lens set at a second position at a second time point, and there is an offset value between the first position and the second position.

4. The distance measurement device of claim 3, wherein the image capturing device respectively obtains a first image and a second image of the target area at the first time point and at the second time point, the controller calculates a distance difference of a first distance of a target in the first image and an edge of the image and a second distance of the target in the second image and an edge of the image, and obtains the separation distance between the lens set and the target area according to the offset value, the distance difference, and a distance between the lens set and the image capturing device.

5. The distance measurement device of claim 4, wherein the separation distance is equal to $$\frac{dL}{dPD} - D,$$

wherein dL is the offset value, dPD is the distance difference, and D is the distance between the lens set and the image capturing device.

6. A distance measurement device, comprising:
an image capturing device;
a lens set having a first side facing the image capturing device and a second side facing a target area, wherein the first side is opposite to the second side, and the lens set is a lens set with a variable focal length; and
a controller coupled to the image capturing device,
wherein the controller respectively adjusts a focal length of the lens set at a plurality of time points, the image capturing device respectively obtains a plurality of images of the target area at the time points, and the controller obtains a separation distance between the lens set and the target area according to the images.

7. The distance measurement device of claim 6, wherein the controller makes the lens set have a first focal length at a first time point, the image capturing device obtains a first image of the target area at the first time point, the controller adjusts the lens set to have a second focal length at a second time point, and the image capturing device obtains a second image of the target area at the second time point.

8. The distance measurement device of claim 7, wherein the controller calculates a first size of a target in the first image, calculates a second size of the target in the second image, and the controller calculates the separation distance according to the first focal length, the second focal length, the first size, the second size, and a distance between the lens set and the image capturing device.

9. A head mounted display apparatus, comprising:
a distance measurement device, comprising:
an image capturing device;
a lens set having a first side facing the image capturing device and a second side facing an eyeball of a user, wherein the first side is opposite to the second side;
a position adjuster coupled to the image capturing device and the lens set, and is configured to adjust positions of the image capturing device and the lens set; and
a controller coupled to the image capturing device,
wherein the position adjuster respectively adjusts the positions of the image capturing device and the lens set at a plurality of time points, the image capturing device respectively obtains a plurality of images of the eyeball at the time points, and the controller obtains a separation distance between the lens set and the eyeball according to the images.

10. The head mounted display apparatus of claim 9, further comprising:
an infrared transmitter emitting a plurality of infrared light beams to the eyeball to form a plurality of light spots on the eyeball,
wherein the controller calculates distances between the light spots and the lens set according to the images of the eyeball, and calculates a curvature of the eyeball according to distances between the light spots and the lens set.

11. A head mounted display apparatus, comprising:
a distance measurement device, comprising:
an image capturing device;
a lens set having a first side facing the image capturing device and a second side facing a target area, wherein the first side is opposite to the second side, and the lens set is a lens set with a variable focal length; and
a controller coupled to the image capturing device,
wherein the controller respectively adjusts a focal length of the lens set at a plurality of time points, the image capturing device respectively obtains a plurality of images of the target area at the time points, and the controller obtains a separation distance between the lens set and the target area according to the images.

12. The head mounted display apparatus of claim 11, further comprising:
an infrared transmitter emitting a plurality of infrared light beams to the eyeball to form a plurality of light spots on the eyeball,
wherein the controller calculates distances between the light spots and the lens set according to the images of the eyeball, and calculates a curvature of the eyeball according to distances between the light spots and the lens set.

* * * * *